United States Patent
Alghoniem (10) Patent No.: US 10,212,274 B2
(45) Date of Patent: Feb. 19, 2019

(54) SYSTEMS AND METHODOLOGIES FOR CONTROLLING AN ELECTRONIC DEVICE WITHIN A VEHICLE

(71) Applicant: Khaled A. Alghoniem, Riyadh (SA)

(72) Inventor: Khaled A. Alghoniem, Riyadh (SA)

(*) Notice: Subject to any disclaimer, the term of this patent is extended or adjusted under 35 U.S.C. 154(b) by 0 days.

(21) Appl. No.: 15/617,662

(22) Filed: Jun. 8, 2017

(65) Prior Publication Data
US 2018/0359358 A1  Dec. 13, 2018

(51) Int. Cl.
*H04M 3/42* (2006.01)
*H04W 4/14* (2009.01)
*H04W 4/04* (2009.01)
*H04M 3/54* (2006.01)

(52) U.S. Cl.
CPC ....... *H04M 3/42365* (2013.01); *H04M 3/543* (2013.01); *H04W 4/046* (2013.01); *H04W 4/14* (2013.01)

(58) Field of Classification Search
CPC ....... H04W 4/046; H04W 4/80; H04W 48/04; H04W 4/021; H04W 4/12; H04W 48/02; H04W 4/04; H04W 4/40; H04W 4/21; H04W 4/027; H04W 4/023; H04W 48/16; H04W 4/026; H04W 4/14; H04W 4/50; H04W 64/00
See application file for complete search history.

(56) References Cited

U.S. PATENT DOCUMENTS

| | | | |
|---|---|---|---|
| 2011/0063098 A1* | 3/2011 | Fischer | G07C 9/00119 340/439 |
| 2011/0105097 A1 | 5/2011 | Tadayon et al. | |
| 2011/0295458 A1 | 12/2011 | Halsey-Fenderson | |
| 2013/0069802 A1 | 3/2013 | Foghel et al. | |
| 2013/0124038 A1 | 5/2013 | Naboulsi | |
| 2013/0145065 A1* | 6/2013 | Ricci | H04W 4/90 710/241 |
| 2013/0295908 A1 | 11/2013 | Zeinstra et al. | |
| 2013/0303106 A1* | 11/2013 | Martin | H04W 4/12 455/404.2 |

(Continued)

OTHER PUBLICATIONS

Howard, B., "Ford Smart Car Locks Your Phone When You're Stressed or Distracted", ExtremeTech, URL: http://www.extremetech.com/extreme/132247-this-smart-car-locks-out-calls-and-texts-but-only-when-it-senses-heavy-traffic, 7 Pages total, (Jul. 4, 2012).

*Primary Examiner* — Allahyar Kasraian
(74) *Attorney, Agent, or Firm* — Oblon, McClelland, Maier & Neustadt, L.L.P.

(57) ABSTRACT

A system and method for controlling an electronic device, the method including identifying, by processing circuitry of a controller, at least one electronic device located within a vehicle, the processing circuitry including a first register configured to store at least a factors vector characterizing the vehicle and a user of the at least one electronic device, determining, by the processing circuitry of the controller, an operating status of the vehicle, updating, by the processing circuitry of the controller, one or more values of the factors vector based on the operating status of the vehicle, identifying, by the processing circuitry of the controller, one or more functions of the at least one electronic device based on the factors vector, and controlling the identified one or more functions of the at least one electronic device.

18 Claims, 8 Drawing Sheets

(56) References Cited

U.S. PATENT DOCUMENTS

| | | | |
|---|---|---|---|
| 2015/0148019 A1* | 5/2015 | Michaelis | H04M 1/72563 |
| | | | 455/418 |
| 2015/0256669 A1* | 9/2015 | James | H04M 1/72577 |
| | | | 455/418 |
| 2016/0248904 A1* | 8/2016 | Duvaut | H04M 1/72577 |
| 2017/0006151 A1* | 1/2017 | Doorandish | H04W 4/90 |
| 2017/0276764 A1* | 9/2017 | Vilermo | H04W 88/02 |

* cited by examiner

SYSTEMS AND METHODOLOGIES FOR CONTROLLING AN ELECTRONIC DEVICE WITHIN A VEHICLE

BACKGROUND

Mobile phones have increased in popularity over the years. Despite of the benefits of mobile phones, mobile phones pose a hazard when used while operating a vehicle. For example, users attempting to use a mobile phone while operating a vehicle are at a significant risk of being distracted and therefore at a significant risk of causing an accident that could harm themselves and others.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

The present disclosure relates to a method for controlling an electronic device. The method includes identifying, by processing circuitry of a controller, at least one electronic device located within a vehicle. The processing circuitry includes a first register configured to store at least a factors vector characterizing the vehicle and a user of the at least one electronic device. The method further includes determining an operating status of the vehicle, updating one or more values of the factors vector based on the operating status of the vehicle, identifying one or more functions of the at least one electronic device based on the factors vector, and controlling the identified one or more functions of the at least one electronic device.

A system for controlling an electronic device, the system includes circuitry. The circuitry is configured to identify at least one electronic device located within a vehicle, the processing circuitry including a first register configured to store at least a factors vector characterizing the vehicle and a user of the at least one electronic device, determine an operating status of the vehicle, update one or more values of the factors vector based on the operating status of the vehicle, identify one or more functions of the at least one electronic device based on the factors vector, and control the identified one or more functions of the at least one electronic device.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Referring now to the drawings, wherein like reference numerals designate identical or corresponding parts throughout several views, the following description relates to a system and associated methodology for controlling an electronic device within a vehicle.

Figure 1:
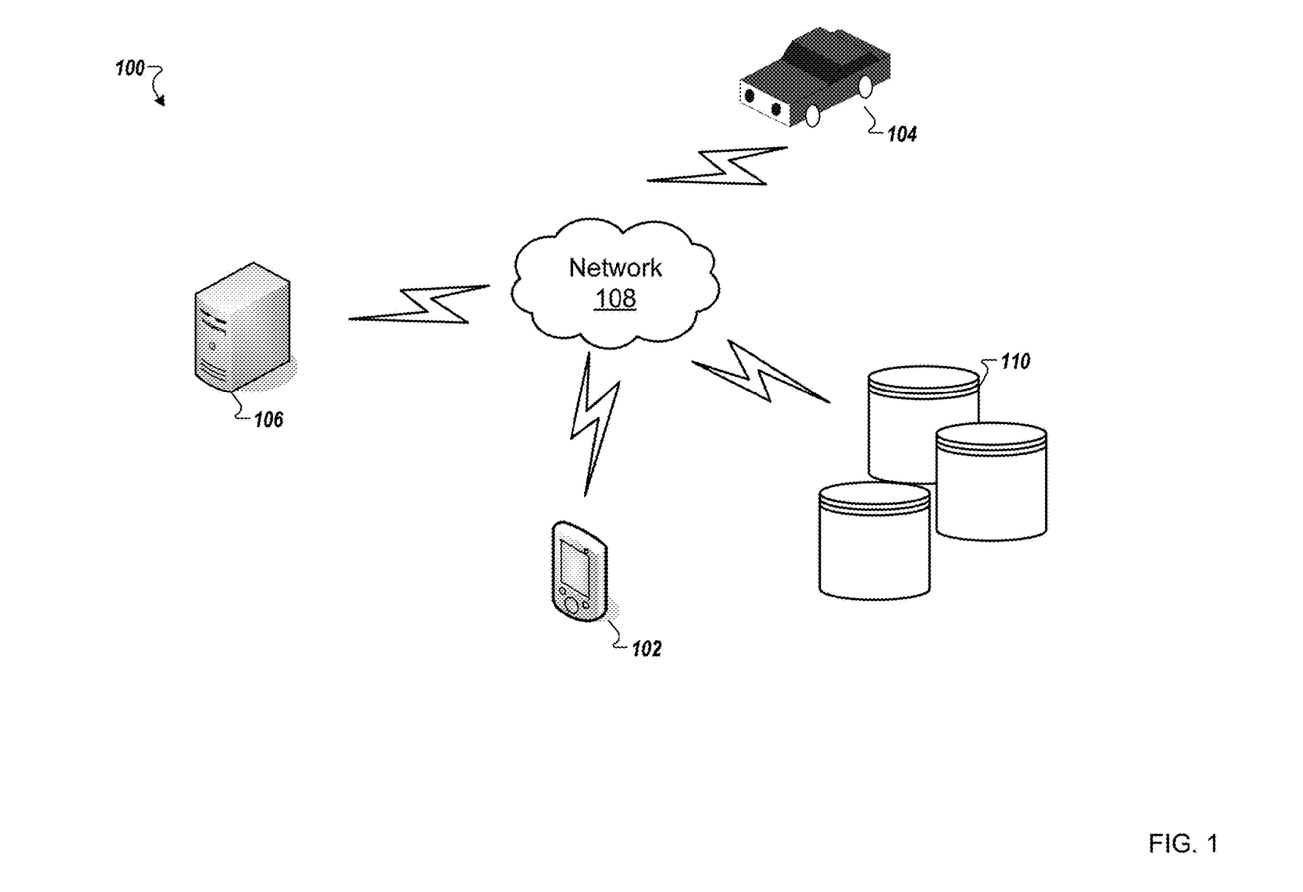
FIG. 1 is a schematic diagram of a system for controlling an electronic device within a vehicle according to one example.

FIG. 1 is a schematic diagram of a system 100 for controlling an electronic device 102 within a vehicle 104. The system 100 may include an electronic device controller 106. The vehicle 104 may be any vehicle 104, such as an automobile, a truck, a bus, an airplane, a train, a tractor, a boat, a motorcycle, a bicycle or any other vehicle 104 that may require an operator to concentrate during operation.

The electronic device 102 may include a mobile phone, a computer, a media player, a personal digital assistant (PDA), a text messenger, and the like. The electronic device 102 includes passenger electronic devices used by passengers within the vehicle 104. The electronic device 102 is capable of communication wirelessly over an in-vehicle or out of-vehicle network. The electronic device 102 may perform multiple functions including use of a keyboard, wireless transmitter, wireless receiver, text messaging, control of the ringer, e-mailing, web surfing, hands free talking, media playing, and the like.

Figure 8:
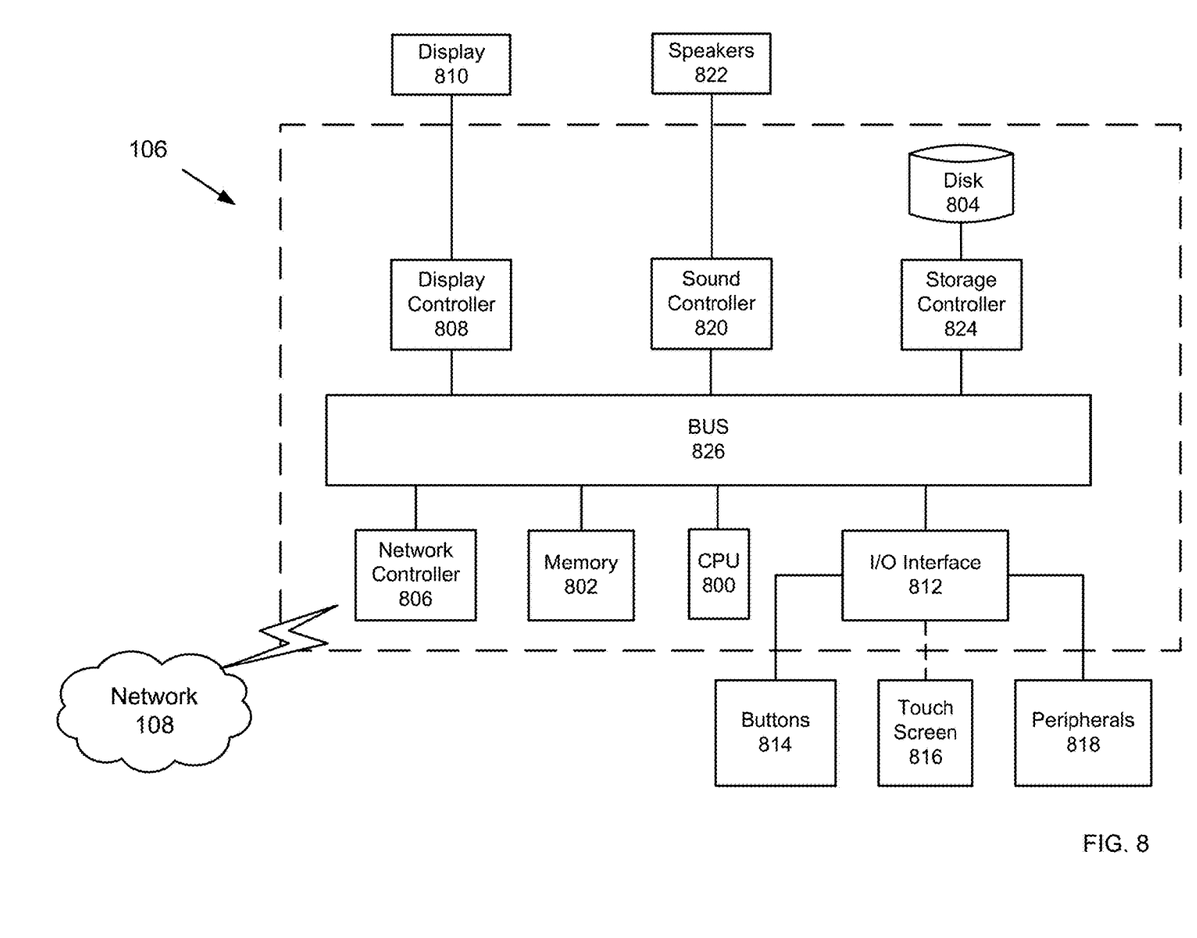
FIG. 8 is an exemplary block diagram of an electronic device according to one example.

The electronic device controller 106 may disable or modify one or more functions of the electronic device 102 based on one or more factors. For example, the electronic device controller 106 may automatically shut down or minimize an application and/or activate a predefined application when the vehicle is determined to be moving. The electronic device controller 106 may include a CPU 800 and a memory 802 as shown in FIG. 8.

The vehicle 104 and the electronic device 102 may be configured to communicate with one another using any suitable communication technologies, devices, media, and protocols supportive of data communications, including, but not limited to, socket connections, Ethernet, data bus technologies, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Markup Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

The electronic device controller 106, the electronic device 102, and the vehicle 104 may be configured to communicate with each other over one or more networks 108. The one or more networks 108 may include one or more networks or types of networks capable of canning communications and/or data signals between the components of system 100. For example, the one or more networks 108 may include, but are not limited to, a satellite network, a wireless network (e.g., a and/or mobile telephone network), a Bluetooth network, the Internet, an intranet, a local area network, any other suitable network, and/or any combination or sub-combination of these networks. Additionally or alternatively, the electronic device controller 106 and the electronic device 102 may be configured to communicate one with another in any other suitable manner (e.g., via a direct connection).

The system 100 may include a database 110. The database 110 may be one or more databases 110 configured to store users' information, local government rules, federal government rules, parent/guardian rules, user preference, and the like. The database 110 may be stored in the memory 802 and/or a cloud based database.

In one implementation, the electronic device controller 106 may be included as part of the vehicle 104 or the electronic device 102. In other implementations, the electronic device controller 106 may be a server. The server may monitor and control multiple electronic devices located within multiple vehicles.

The description herein is provided with reference to the system being located and implemented external to the electronic device 102. However, it is to be understood that the system may alternatively or additionally be implemented within the electronic device 102, where the electronic device 102 may contain hardware similar to that illustrated in FIG. 8, and the databases of the system may correspond to a memory of the electronic device 102. Further, in some embodiments, the system 100 may be implemented as an application that may be downloaded on the electronic device 102.

Figure 2:
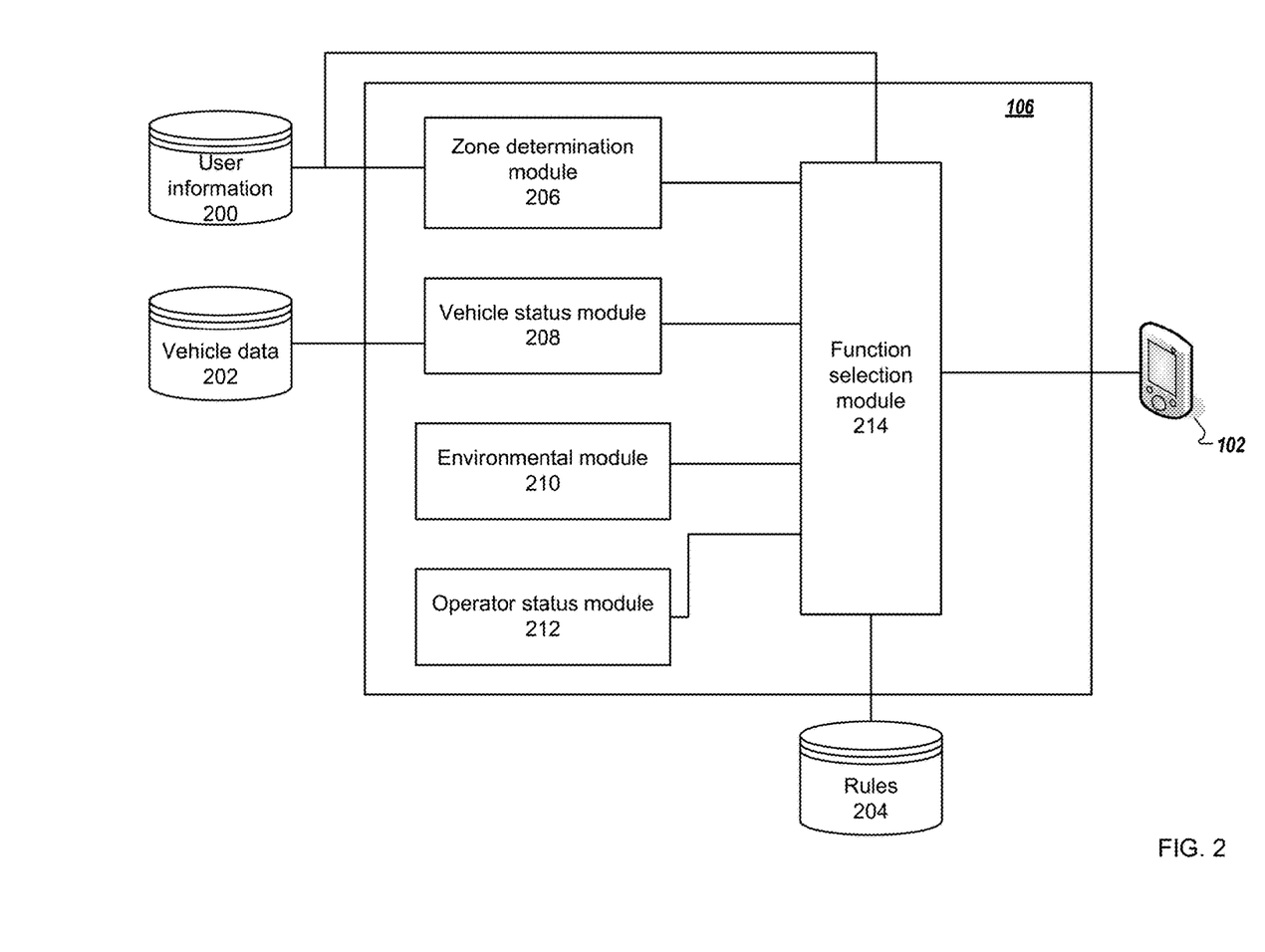
FIG. 2 is a block diagram of the system of FIG. 1 according to one example.

FIG. 2 is a block diagram representation of the system 100 for controlling the electronic device 102 within the vehicle 104 according to one example. The system 100 may include a zone determination module 206, a vehicle status module 208, an environmental module 210, an operator status module 212, and a functions selection module 214.

The one or more functions of the electronic device 102 that are modified/disabled are identified based on one or more factors by the function selection module 214. The value of the factors may be stored in a factor vector associated with the electronic device in a register of the electronic device controller 106. The factors may include a location of the electronic device 102 in the vehicle 104. The area of the vehicle 104 may be divided into predefined detection zones. In some implementations, the area of the vehicle 104 may be defined by the area within which electronic devices may communicate directly with the electronic device controller 106.

Figure 3:
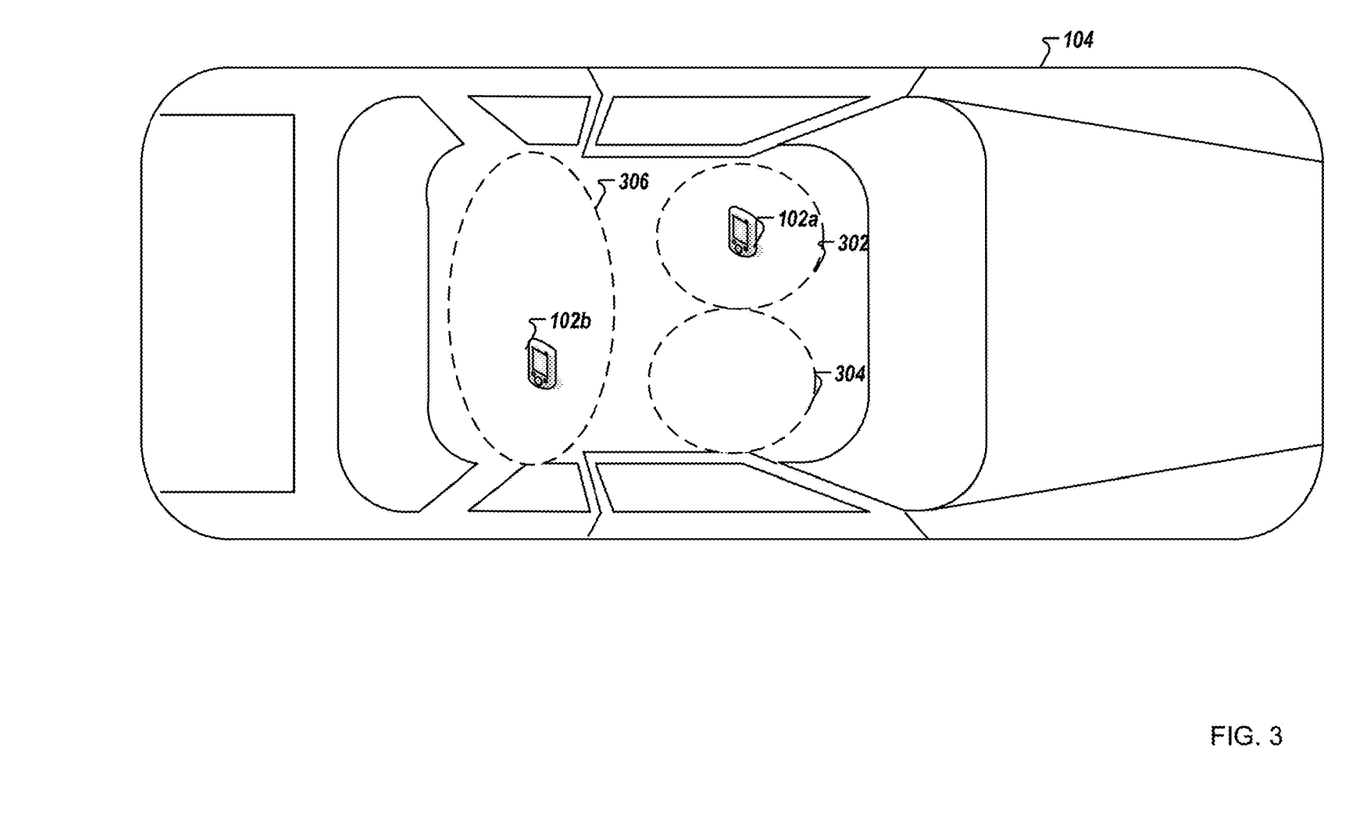
FIG. 3 is a schematic that illustrates multiple detection zones according to one example.

The boundaries of a predefined detection zone may include any suitable area as may serve a particular implementation. For example, as shown in FIG. 3, the predefined detection zone may include a circle having a radius that is a predetermined distance from the center of a driver seat. The zone determination module 206 may determine the perimeter of a zone based on dimensions of the vehicle 104. For example, one predefined detection zone may be the portion of the vehicle 104 in which an operator is capable of having access to the electronic device 102.

The zone determination module 206 may distinguish between an operator of the vehicle and a passenger based on the location of the electronic device 102 in the vehicle 104. Alternatively or additionally, the distinction may be based on an association between a particular electronic device and a user who typically operates the vehicle 104. For example, a typical driver for a vehicle (e.g., identified by a vehicle identification number (VIN)) may be stored in a vehicle data database 202.

The one or more functions disabled/modified may be identified based on an operating status of the vehicle 104. The vehicle status module 208 may determine one or more operating parameters of the vehicle 104. For example, the vehicle status module 208 may detect when a transmission of a vehicle is in gear (e.g., in "drive"). The vehicle status module 208 may also determine a parameter associated with the ignition of the vehicle 104, a parameter associated with the parking brake of the vehicle 104, a parameter associated with the speed of the vehicle 104, and the like, as described further below. For example, when the speed of the vehicle 104 is below a threshold a texting functionality of the electronic device may be disabled but a voice calling functionality may be permitted. When the speed of the vehicle 104 is above the threshold both the texting and voice calling functions of the electronic device 104 may be disabled.

In one implementation, the one or more functions disabled/modified may be identified based on weather conditions. For example, one or more functions of the electronic device 102 may be disabled only during inclement weather. Inclement weather may be based on various factors such as presence of heavy rain or sleet, or any other condition that may require increased concentration from the operator of the vehicle 102. The environment module 210 may receive weather data from sensors configured to measure the temperature and humidity inside and outside of the vehicle 104, or data/forecasts from web sites (e.g., Weather Channel). The environment module 210 can update one or more values of the factor vector accordingly.

The one or more functions to be disabled/modified may be identified based on a hand status of the operator of the vehicle 104. The operator status module 212 may determine a hand status of the operator of the vehicle 104 based on data obtained from a sensor positioned on a steering wheel of the vehicle 104. An exemplary steering wheel is shown and described in FIG. 4. In some implementations, the status may be determined based on the position of the hands detected from an image captured by a camera. Image processing techniques may be used to detect the position of the hands in the image as would be understood by one of ordinary skill in the art.

Figure 4:
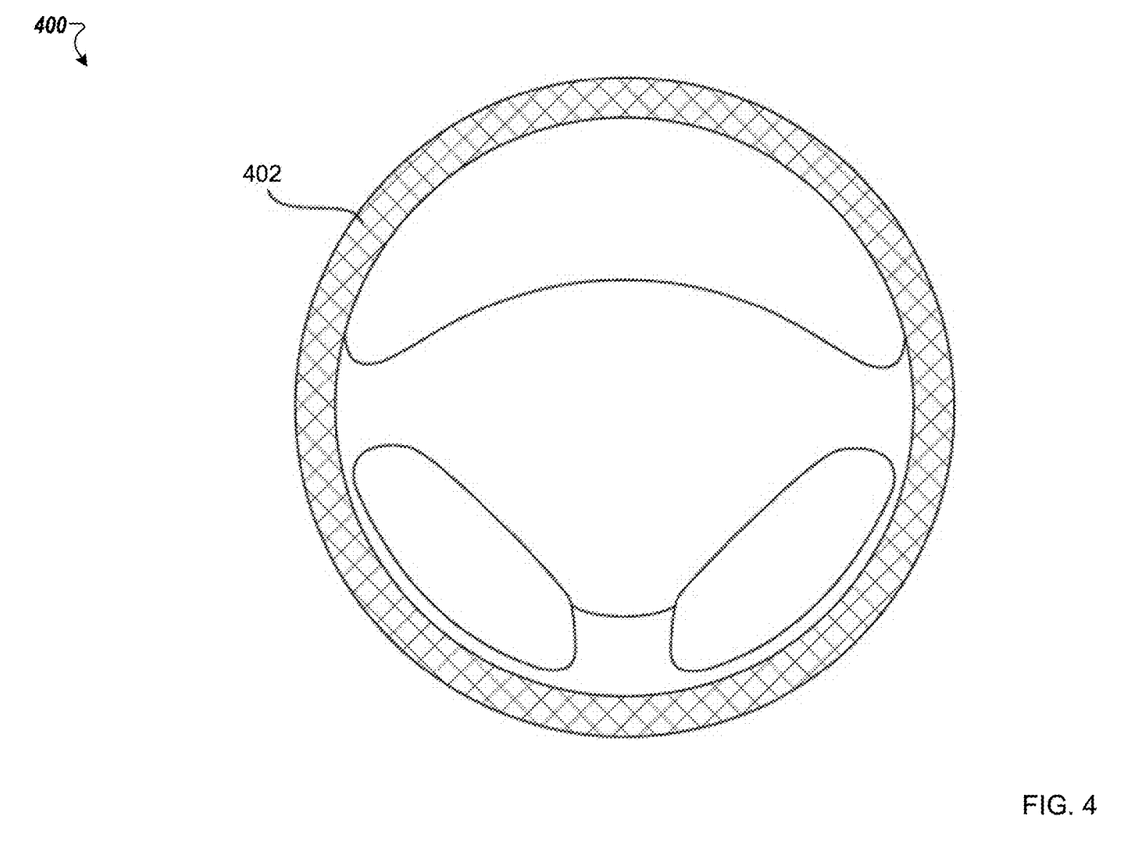
FIG. 4 is a schematic that illustrates a steering wheel equipped with a touch sensor according to one example.

In one exemplary implementation a camera sensor, including, for example, an infrared (IR) sensor may be placed within the vehicle and positioned to have the steering wheel in its view. The IR sensor may be enabled to detect hand placement on steering wheel 402. For example, the IR sensor may detect that one hand is placed on steering wheel 402 or two hands are placed on the steering wheel 402 and communicate the detected hand placement to electronic device controller 106. Electronic device controller 106 may then determine what services are to be disabled/modified based on the hand placement.

Disabling and/or modifying a service may include, and is not limited any of: turning device 102 on or off, deactivating a display of device 102, controlling the operation a specific application running on device 102, and/or controlling a specific feature of an application running on device 102. For example, an application, such as text messaging application, may be turned off completely as a way to control the operation of the application, or a type/text option within the text messaging application may be disabled while maintaining a voice command feature, for example, as a way to control a specific feature of the application.

The electronic device controller 106 may modify the texting application (e.g., activate a driving mode) such as to minimize distraction risks, for example, the controller 106 may increase the font size of incoming text messages. In one example, the controller 106 may modify the texting application such as to display only a text version of the incoming text messages (i.e., remove animations, photos from the text message). Further, the electronic device controller 106 may modify a keyboard of the texting application (e.g., hide buttons) to restrict access to additional functionalities such as inserting photos or videos into the text message, inserting emoji's, and the like.

Further, the electronic device controller 106 may limit the functionalities of the electronic device 102 when receiving an incoming call. For example, only an "answer" button may be provided to the user. In one implementation, the whole display of the electronic device 102 may function as the "answer" button. For example, the electronic device controller 106 may activate the incoming call in response to detecting a touch event at any location of the display of the electronic device 102. In other words, the user may touch any location on the display to activate the incoming call which minimizes distractions.

Before making a determination on how to effectively control device 102, device controller 106 initially determines the operating parameters of the vehicle. For example if the vehicle is not being operated, then it is irrelevant whether a driver has one hand, two hands or no hands on the steering wheel.

For example, if one hand is placed on the steering wheel or when no hand is detected on the steering wheel, then electronic device controller 106 may disable device 102 entirely to prevent the driver from picking up device 102 and activating a phone application or a text messaging application while driving. Accordingly, in determining an operation mode, device controller 106 determines if the vehicle is operational or off, and if it is determined to be operational, device controller 106 further determines a moving operation of the vehicle. A vehicle can be operational and not moving. As such, it is possible for a driver of vehicle 104 to use device 102 while vehicle 104 is operational, if vehicle 104 is in a non-moving state. This way, a driver of vehicle 104 may not be precluded from utilizing device 102 while parked with vehicle 104 is on, for example.

In yet another example, device controller 106 may set threshold speeds for control exceptions that can be implemented when vehicle 104 is detected to be traveling at those speeds. For example, if an operational speed is determined to be below a threshold, e.g., below 5 mph, or any other threshold programmed by a manufacturer, an authorized dealer, a user or a parent of a user, local government rules and federal government rules stored in database 110, device controller 106 may allow use of device 102, for certain applications only. When an operational speed is determined to be below a threshold speed, it is assumed that a driver may be parking, or driving at very slow speeds and thus may safely handle the phone. In a non-limiting implementation, the above-noted low level threshold may be implemented to designate a limited use of device 102 such that the user may be precluded from certain uses, such as using text messaging application, but can, for example, use other application, such as calling application. Further, the electronic device controller 106 may monitor the speed of the vehicle 104 to determine whether to perform a change in the disabled/permitted functionalities. For example, if the electronic device controller 106 determines that there is a change in the speed of the vehicle 104, such as the speed of the vehicle 104 exceeds the threshold speed, the electronic device controller 106 may output a warning (e.g., a beep) to the user when a previously allowed application is being used. Then, the electronic device controller 106 may determine the speed of the vehicle 104. In response to determining that the speed of the vehicle 104 did not decrease below the threshold speed, the electronic device controller 106 may disable the calling application or functionality.

Limitations of use of device 102 may affect how the device handles incoming information internally or how the device routes the operations to an in-vehicle command system. In one exemplary implementation, device controller 106 may limit certain applications to be run only on device 102. In other implementations, device controller 106 may enable device 106 to route calls/messages and other applications to the in-vehicle command system to allow a driver to utilize the applications without physically picking up device 102. In one implementation, the one or more functions may be identified based on one or more attributes of the operator of the vehicle 104 or passenger(s) (e.g., age, occupation, or exemptions). More functions may be disabled for a student driver compared to an experienced driver. For example, the hands free talking function may be disabled in an electronic device associated with the student driver but not disabled in an electronic device associated with the experienced driver. Further, some of the functions are not disabled based on an occupation of the operator of the vehicle 104. The occupation of the operator may be determined by referencing the user information database 200. For example, functions of the electronic device 102 that may be used by a medical doctor are not disabled or modified. Exemptions for not disabling certain functions of the electronic device 102 may be included when connected to a hands free talking system. For example, voice calls are not disabled when the electronic device 102 is connected to the hands free talking system.

The one or more functions may also be identified based on local/federal rules and regulations. A rules database 204 may store the local/federal rules and regulations for multiple locations. The function selection module 214 may determine the location of the vehicle 104. Then, the function selection module 214 may retrieve the rules by referencing the rules database 204. For example, when a local rule of an area (e.g., city, state, county) forbids "text messaging" while driving, the texting functionality of the electronic device 102 is disabled while the vehicle is within the boundary of the area.

The geographic location of the vehicle 104 may be determined by a plurality of methods. The geographic location may also correspond with the electronic device 102. That is, once the electronic device's location is determined by any of the techniques described herein or other methods as known in the art, the vehicle's location is also likely established. The vehicle location or the electronic device's location can be determined via various satellite-based positioning systems known in the art, such as GPS (Global Positioning System). For example, the vehicle 104 may include a location detector. The location detector may be a GPS module for detecting a current geographical location of the vehicle 104. In one embodiment, the electronic device's location is determined via a cellular tower with which communication has been established using current technology such as GSM (Global System for Mobile) localization, triangulation, Bluetooth, hotspots, WiFi detection, or other methods as would be understood by one of ordinary skill in the art. The electronic device's location can be determined by the network 108. In particular, the CPU 800 may detect a location of the electronic device 102 as a network address on the network 108.

The modules described herein may be implemented as either software and/or hardware modules and may be stored in any type of computer-readable medium or other computer storage device. For example, each of the modules described herein may be implemented in circuitry that is programmable (e.g. microprocessor-based circuits) or dedicated circuits such as application specific integrated circuits (ASICS) or field programmable gate arrays (FPGAS). In one embodiment, a central processing unit (CPU) could execute software to perform the functions attributable to each of the modules described herein. The CPU may execute software instructions written in a programming language such as Java, C, or assembly. One or more software instructions in the modules may be embedded in fin mare, such as an erasable programmable read-only memory (EPROM).

In some implementations, the processes associated with each of the modules may be performed by one or more processors of a server or other computing resources, which can include cloud computing resources.

FIG. 3 is a schematic that illustrates multiple predefined detection zones within the vehicle 104 and electronic devices 102a and 102b. In one example, the predefined detection zones may include a driver zone 302, a front passenger zone 304, and a back seat passenger zone 306.

The zone determination module 206 may detect that the electronic device 102a is located within the driver zone 302 of vehicle 104. One or more functions of the electronic device 102a may be disabled/modified based on an operating status of the vehicle 104 (e.g., operating status module 208) to ensure safe operation of vehicle 104 by the operator. Further, the electronic device controller 106 may control the sound volume (e.g., ringer) of the electronic devices located in the front passenger zone 304 and the back seat passenger zone 306 such that not to disturb the operator of the vehicle 104 (e.g., electronic device 102b). In another example, device controller 106 may be programmed to control certain applications of devices 102a and 102b depending on the zone in which they are in, even if neither device is detected to be in the driver zone 302. For example, device controller 106 may limit a video application of device 102b if the device is detected within passenger zone 304, but may enable the same application if device 102b is detected to be within passenger zone 306. Such implementation may help reduce distractions to the driver. A video application is merely used as an exemplary implementation and any other application associated with device 102 may be disabled/modified depending on the location of device 102b within passenger zones. For example, if a driver within driver zone 302 does not wish to have a passenger directly behind him, within passenger zone 102b, then device controller 106 may be configured to detect sub-zones within zone 102b (not shown) such that a telephone application associated with device 102b located directly behind the driver would be inhibited.

FIG. 4 is a schematic that illustrates a steering wheel 400 equipped with a touch sensor 402 according to one example. The sensor 402 may be attached to or embedded in the steering wheel 400. The sensor 402 may include one or more switches that are actuated by the respective hand of the operator when properly placed on the steering wheel 400.

In addition, a sensor may be attached to or embedded in the gear stick/gear selector. The operator status module 212 may check to see whether two hands are detected, for example, two hands on the steering wheel, or one hand on the steering wheel and on the gear stick. When the operator status module 212 fails to detect two contact points, one or more functions of the electronic device 102 are disabled/modified as described previously herein.

In one implementation, the system 100 may be modified to permit use with only one signal detected to permit use by drivers having only one hand. The one hand/two hands status may be stored in the user information database 200.

Figure 5:
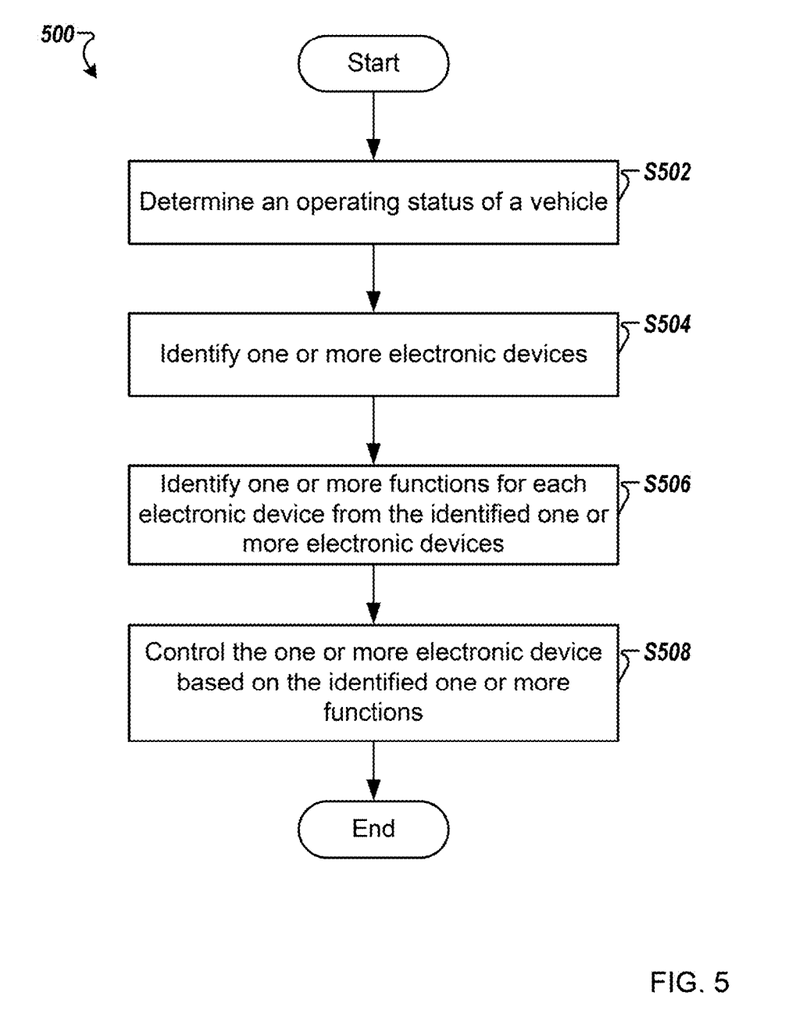
FIG. 5 is a flowchart that shows a method for controlling the electronic device according to one example.

FIG. 5 is a flowchart that shows a method 500 for controlling the electronic device 102 according to one example. At step S502, the method 500 may begin by determining an operating status of a vehicle.

At step S504, the electronic device controller 106 may identify one or more electronic devices 102 that are located within the vehicle 104. Further, for each identified electronic device 102, a zone associated with the electronic device 102 is identified (e.g., by the zone determination module 206 of FIG. 2). For example, a determination is made as to whether an electronic device is in the "driver zone". The zone may be a function of the proximity to the operator of the vehicle.

A step S506, the electronic device controller 106 may identify one or more functions of the electronic device 102 to be disabled or modified based on multiple factors such as zone, environmental conditions, identity of the user, and the like as described previously herein.

At step S508, the electronic device controller 106 may control the one or more functions identified at step S506. The electronic device controller 106 may modify or disable the identified functions. For example, the electronic device controller 106 may modify the texting functionality of the electronic device 102. An exemplary method for modifying the operation of the texting functionality of the electronic device 102 is shown in FIG. 6.

In one example, when one or more attributes or conditions are true or satisfied, the electronic device controller 106 may override other rules and the functions of the electronic device 102 are not disabled or modified. For example, an override pin may be used to enable one or more functions of the electronic device 102 regardless of the other conditions (e.g., vehicle in motion, inclement weather, and the like). The conditions may include an automatic driving mode detected by the vehicle status module 208.

The electronic device controller 106 may not disable or modify the functions of the electronic device 102 when an emergency has occurred. The determination of when an emergency has occurred by electronic device controller 106 may be made in several ways. For example, the electronic device controller 106 may detect an airbag deployment, or receive data from a crash detector included in the vehicle 104. The crash detector of the vehicle 104 may be configured to communicate emergency information with the electronic device controller 106, for example, if an airbag deployment is detected by the vehicle, the electronic device controller 106 may be alerted via the crash detector that an emergency has occurred and the disabling of the electronic device 102 may be overridden such that the operator may use the electronic device 102. Further, in some implementations, the electronic device controller 106 may automatically send an alert to notify the proper authorities of the emergency situation.

Figure 6:
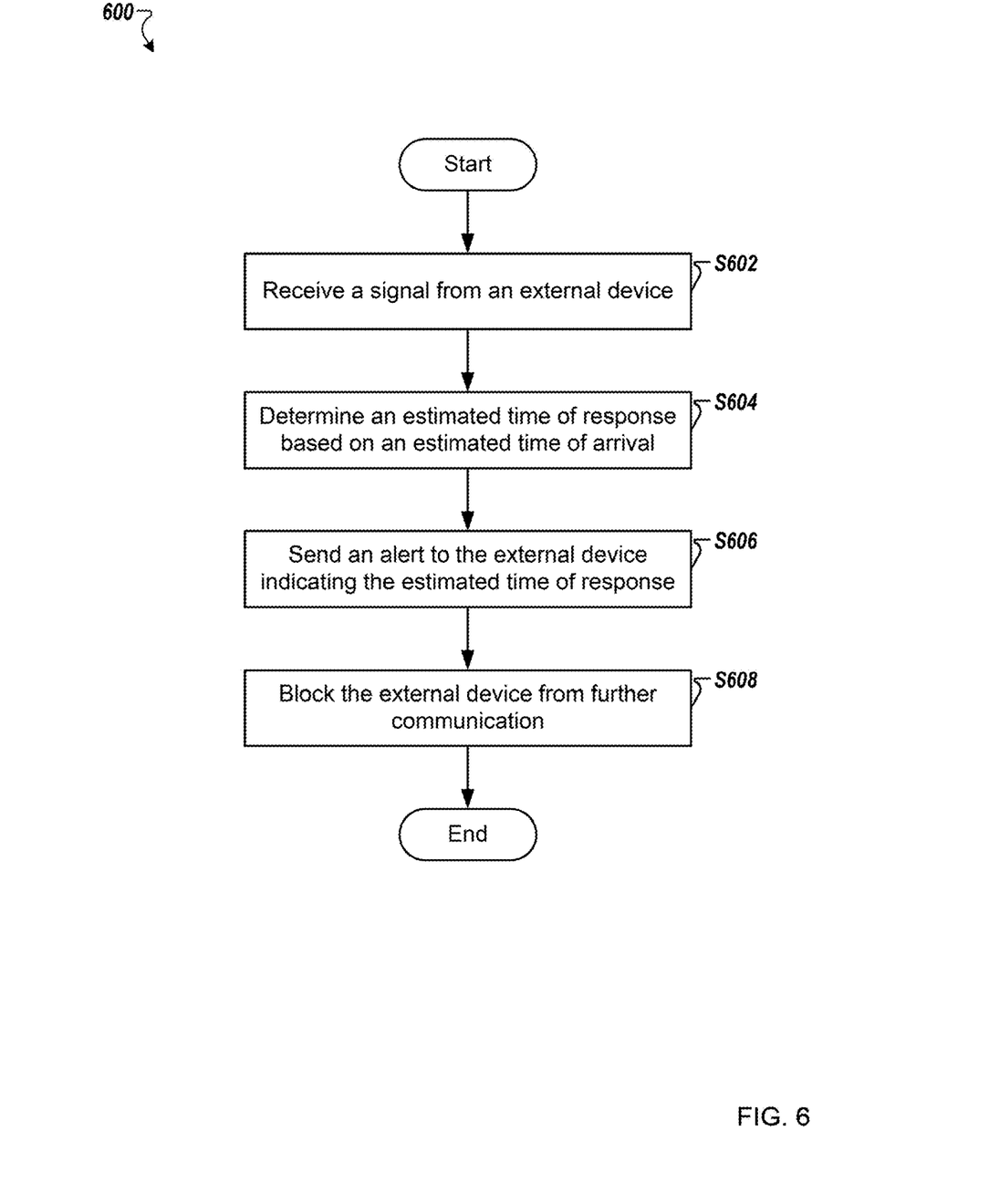
FIG. 6 is a flowchart that shows a method for controlling a texting functionality of the electronic device according to one example.

FIG. 6 is a flowchart that shows a method 600 for controlling a texting functionality of the electronic device 102 according to one example. At step S602, the electronic device controller 106 may detect a signal from an external device. For example, the electronic device controller 106 may detect that the electronic device 102 has received a text message from the external device. It is understood by one of ordinary skill in the art that texting functionality is a non-limiting exemplary implementation and other applications may also be controlled in similar fashion. For example, method 600 may be applicable to telephone calls as well.

At step S604, the electronic device controller 106 may determine an estimated time of arrival to a destination of the text message recipient (e.g., operator of the vehicle). Then, the electronic device controller 106 may determine an estimated time of response as a function of the estimated time of arrival. For example, the electronic device controller 106 may add a predetermined period (e.g., 5 minutes, 10 minutes) to the estimated time of arrival. The estimated time of arrival may be determined based on a route plan. The route plan and a current location may be obtained from a navigation system of the vehicle 104, or a navigation application running on the electronic device 102. The route plan may be generated by a commercially available route planner such as Google Map™.

At step S606, the electronic device controller 106 may output an alert to a sender that the recipient is currently driving and is not able to respond. For example, when the driver receives a text message, the electronic device controller 106 may automatically reply with a preset text message indicating that the recipient may not reply. The electronic device controller 106 may alert the sender of the estimated time of response.

At step S608, the electronic device controller 106 may block the external device associated with the sender from further communication with the electronic device 102. For example, assuming device 102 receives a text message or call from a contact, device controller 106 may output the message to the in-vehicle command system for the driver to read or, alternatively, the in-vehicle command system may read out the text message and output the readout through the speakers. The driver may then select, or alternatively, device controller 106 may automatically transmit, a message to the sender indicating that the recipient is currently driving and will be unable to respond until a predetermined time. As mentioned above, the predetermined time may be based on a detected time of arrival to a destination, based on input from a device 102 GPS system or an in-vehicle GPS system. The predetermined time may further include an additional buffer time, such as 5 minutes, allocated to additional activities, like parking, settling in, and the like, in order to give the sender appropriate notice of when to expect a response. In yet another embodiment, the driver may elect to transmit a different message to the sender. Such message may be input through the in-vehicle command system in coordination with the device controller 106. For example, if device controller 106 detects sever weather conditions or excessive travel speeds, then device controller 106 may prohibit any user input as a response to the sender and instead, transmit the automatic message.

In addition, the electronic device controller 106 may automatically activate a concierge service that can type texts and can send the texts on driver's behalf when the texting function is disabled.

In one implementation, the electronic device controller 106 may trigger a message to a parent or an owner of the vehicle in case of a detected texting activity when the age of the operator is below a predefined age. The age of the operator may be retrieved from the user information database 200. The predefined age may be set by the owner of the vehicle 104.

The electronic device controller 106 may further track attempts to use a disabled function. For example, the electronic device controller 106 may update an attempt counter by a predetermined incremental value in response to detecting an attempt to use a disabled function. The attempt may include activating an element associated with the function by the operator. For example, when the text messaging function is disabled, the electronic device controller 106 may update the attempt counter in response to detecting the operator of the vehicle 102 trying to activate the text messaging application, for example, by detecting a touch at an area of a display of the electronic device 102 associated with a text message application.

In one example, when the attempt counter reaches a threshold value, the electronic device controller 106 may provide a report to authorities (e.g., a state vehicle inspection). The report may also include other vehicle information such as a number of vehicle crashes detected by the crash detector.

The electronic device controller 106 may implement a device time-out period (e.g., disabling all functions of the electronic device 102) as a punishment for attempting to use a disabled function, except when an emergency has occurred. The device time may be implemented when the attempt counter reaches a predetermined threshold.

The electronic device controller 106 may transfer a call or mirror the electronic device 102 to an electronic device associated with a passenger of the vehicle 104.

Figure 7:
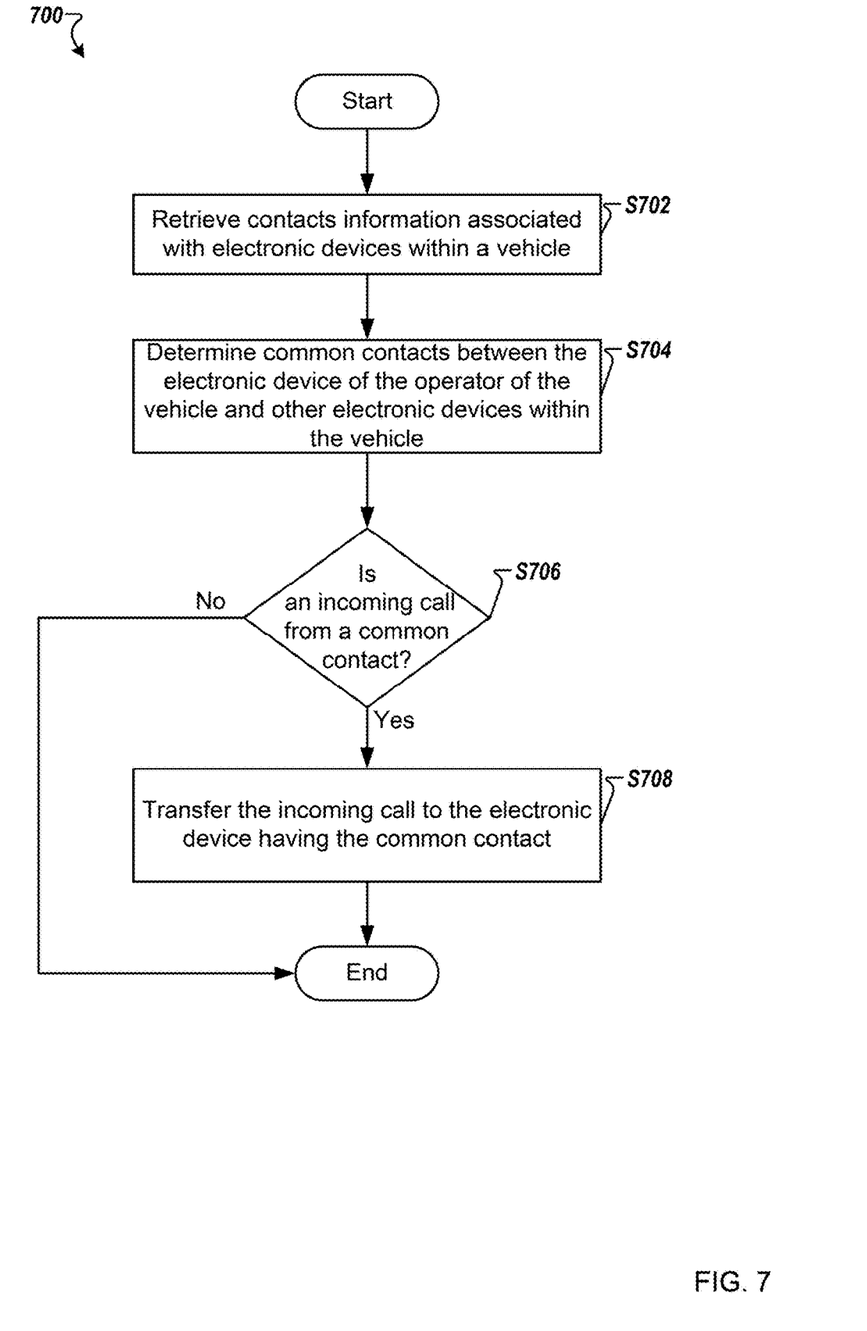
FIG. 7 is a flowchart that shows a method for modifying a functionality of the electronic device.

FIG. 7 is a flowchart that shows a method 700 for modifying a functionality of the electronic device 102 according to one example. At step S702, the electronic device controller 106 may retrieve contact information associated with one or more electronic devices 102 located within the vehicle 104. The one or more electronic devices may be identified as shown and described at step S504 of FIG. 5. The contact information may be retrieved from the memory of the one or more electronic devices. Additionally or alternatively, the contact information may be stored in and retrieved from the user information database 200.

At step S704, the electronic device controller 106 may detect common contacts between an electronic device associated with the operator of the vehicle and other electronic devices within the vehicle 104.

At step S706, the electronic device controller 106 may check to see whether a received call is from a common contact identified at step S704. In response to determining that the received call is from a common contact, the process proceeds to step S708. In response to determining that the received call is not from a common contact, the process ends.

At step S708, the electronic device controller 106 may route the common contact call to the electronic device having the common contact. In one implementation, the electronic device controller 106 may route the call based on a predetermined association. For example, for frequent contacts (e.g., direct family), the user may associate a "route to contact". The electronic device controller 106 may check to see whether there is a "route to contact" with a received call. In response to deter mining that there is a "route to contact" associated with the incoming call, the electronic device controller 106 may route the incoming call to the identified "route to contact".

Although the flow charts show specific orders of executing functional logic blocks, the order of executing the block blocks may be changed relative to the order shown, as will be understood by one of ordinary skill in the art. Also, two or more blocks shown in succession may be executed concurrently or with partial concurrence.

An exemplary implementation of this process may allow for family members or friends, for example, traveling within the same vehicle, to be reachable even if a mobile device associated with one of the travelers is not available. For example, if two siblings are traveling in the same car and one person is driving, then upon receiving a call (e.g. device 102a receiving a call) from a common contact, such as a parent, device controller 106 may re-route the call to a device associated with a passenger (e.g. device 102b). In this way, the driver may still be reached even if his associated device 102a may be restricted. Furthermore, device controller 106 may further add a "re-routed" label to the caller ID appearing on device 102b indicating to the owner that this call is being re-routed from another phone within the vehicle.

Next, a hardware description of the electronic device controller 106 according to exemplary embodiments is described with reference to FIG. 8. In FIG. 8, the electronic device controller 106 includes a CPU 800 which performs the processes described herein. The process data and instructions may be stored in memory 802. These processes and instructions may also be stored on a storage medium disk 804 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the electronic device controller 106 communicates, such as a server or computer.

Further, the claimed advancements may be provided as a utility application, background daemon, or component of an operating system, or combination thereof, executing in conjunction with CPU 800 and an operating system such as Microsoft® Windows®, UNIX®, Oracle® Solaris, LINUX®, Apple macOS™ and other systems known to those skilled in the art.

In order to achieve the electronic device controller 106, the hardware elements may be realized by various circuitry elements, known to those skilled in the art. For example, CPU 800 may be a Xenon or Core processor from Intel of America or an Opteron processor from AMD of America, or may be other processor types that would be recognized by one of ordinary skill in the art. Alternatively, the CPU 800 may be implemented on an FPGA, ASIC, PLD or using discrete logic circuits, as one of ordinary skill in the art would recognize. Further, CPU 800 may be implemented as multiple processors cooperatively working in parallel to perform the instructions of the inventive processes described above.

The electronic device controller 106 in FIG. 8 also includes a network controller 806, such as an Intel Ethernet PRO network interface card from Intel Corporation of America, for interfacing with network 108. As can be appreciated, the network 108 can be a public network, such as the Internet, or a private network such as LAN or WAN network, or any combination thereof and can also include PSTN or ISDN sub-networks. The network 108 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The electronic device controller 106 further includes a display controller 808, such as a NVIDIA® GeForce® GTX or Quadro® graphics adaptor from NVIDIA Corporation of America for interfacing with display 810, such as a Hewlett Packard® HPL2445w LCD monitor. A general purpose I/O interface 812 interfaces with a keyboard and/or mouse 814 as well as an optional touch screen panel 816 on or separate from display 810. General purpose I/O interface also connects to a variety of peripherals 818 including printers and scanners, such as an OfficeJet® or DeskJet® from Hewlett Packard.

A sound controller 820 is also provided in the electronic device controller 106, such as Sound Blaster® X-Fi Titanium® from Creative, to interface with speakers/microphone 822 thereby providing sounds and/or music.

The general purpose storage controller 824 connects the storage medium disk 804 with communication bus 826, which may be an ISA, EISA, VESA, PCI, or similar, for interconnecting all of the components of the electronic device controller 106. A description of the general features and functionality of the display 810, keyboard and/or mouse 814, as well as the display controller 808, storage controller 824, network controller 806, sound controller 820, and general purpose I/O interface 812 is omitted herein for brevity as these features are known.

A system which includes the features in the foregoing description provides numerous advantages to users. In particular, the system automatically controls an electronic device based on multiple factors such as a current status of the user of the electronic device and the status of the vehicle. In addition, the system automatically transfers an incoming voice call to another electronic device within the vehicle thus minimizing distraction of the operator of the vehicle.

Obviously, numerous modifications and variations are possible in light of the above teachings. It is therefore to be understood that within the scope of the appended claims, the invention may be practiced otherwise than as specifically described herein.

The features of the present disclosure provide a multitude of improvements in the field of in vehicle communication safety, call routing and call response. For example, features of the present disclosure allow for hands free text manipulation, either though some form of blockage as described herein, or another form of routing the text data through the vehicle infotainment system. This can help minimize user distraction while driving while achieving the intended goals of safety and facilitated communication. Furthermore, features of the present disclosure also provide the benefit of reaching someone in the vicinity of the person a caller is trying to reach in cases of urgent discussions or emergencies. Additionally, instead of having a caller/text originator continually text without receiving a response, which can create additional distractions for the driver, the system is designed to provide the text originator a response indicating when the driver will be available next to better manage the expectations and reduce any further distractions on the driver. Other improvements also relate to driver safety and motor vehicle control capabilities. For example, the system allows a person, e.g. a parent or a guardian, to monitor the performance of their child and to restrict use of the vehicle or the telephone based on recorded violations. These and other improvements described throughout the disclosure help improve driver safety, in vehicle communication and provides incentives for safe driving and monitoring of driver safety.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system for controlling an electronic device, the system comprising:
    circuitry configured to
        identify at least one mobile electronic device located within a vehicle, the circuitry including a first register configured to store at least a factors vector characterizing the vehicle and a user of the at least one mobile electronic device,
        determine an operating status of the vehicle,
        update one or more values of the factors vector based on the operating status of the vehicle,
        identify one or more functions of the at least one mobile electronic device based on the factors vector, and
        control the identified one or more functions of the at least one mobile electronic device including
            disabling the one or more functions to provide a disabled function,
            detect an attempt to activate the disabled function;
            update an attempt counter in response to detecting an attempt to activate the disabled function; and
            send an alert to an external device when the attempt counter reaches a predetermined threshold.

2. The system of claim 1, wherein the circuitry is further configured to:
    determine a location of the at least one mobile electronic device within the vehicle;
    identify a predefined detection zone associated with the location from a plurality of predefined detection zones; and
    update one or more values of the factors vector based on the identified predefined detection zone.

3. The system of claim 2, wherein each predefined detection zone is a circle having a radius that is a predetermined distance from the center of a driver seat of the vehicle.

4. The system of claim 2, wherein the plurality of predefined detection zones includes a driver zone, a front seat passenger zone, and a back seat passenger zone of the vehicle.

5. The system of claim 1, wherein the circuitry is further configured to:
    generate a reply text message in response to detecting a text message sent from an external device to the at least one mobile electronic device, the reply text message indicating that the user is not available.

6. The system of claim 5, wherein the circuitry is further configured to:
    determine an estimated time of arrival based on a current location of the vehicle and a destination of the user of the at least one mobile electronic device;
    determine an estimated time of response based on the estimated time of arrival;
    send the estimated time of response to the external device; and
    block the external device from further communication with the at least one mobile electronic device.

7. The system of claim 1, wherein the circuitry is further configured to:
    retrieve contacts information associated with one or more second electronic devices located within the vehicle;
    identify common contacts between the at least one mobile electronic device associated with an operator of the vehicle and the one or more second electronic devices associated with passengers of the vehicle;
    determine, in response to detecting an incoming call, whether the incoming call is from a common contact; and
    transfer the incoming call to the second electronic device having the common contact.

8. The system of claim 1, wherein the one or more functions include use of a keyboard, text messaging, wireless transmitter, wireless receiver, control of the ringer, emailing, hands free talking, and web-surfing.

9. The system of claim 1, wherein the circuitry is further configured to:
    retrieve local government rules by referencing a rule database and based on a current location of the vehicle; and
    identify the one or more functions of the at least one mobile electronic device based on the retrieved local government rules.

10. The system of claim 1, wherein the circuitry is further configured to:
    determine a driving experience level of an operator of the vehicle.

11. The system of claim 1, wherein the circuitry is further configured to:
    determine a hand status of an operator of the vehicle; and
    identify the one or more functions of the at least one mobile electronic device based on the hand status of the operator of the vehicle.

12. The system of claim 1, wherein the circuitry is further configured to:
    send a signal to one or more second electronic devices associated with passengers of the vehicle, the signal configured to limit the sound volume of the one or more electronic devices.

13. The system of claim 1, wherein the circuitry is further configured to:
    override, in response to determining that an emergency has occurred, the control of the one or more functions of the at least one mobile electronic device.

14. A method for controlling an electronic device, the method comprising:
    identifying, by processing circuitry of a controller, at least one mobile electronic device located within a vehicle, the processing circuitry including a first register configured to store at least a factors vector characterizing the vehicle and a user of the at least one mobile electronic device;
    determining, by the processing circuitry of the controller, an operating status of the vehicle;
    updating, by the processing circuitry of the controller, one or more values of the factors vector based on the operating status of the vehicle;
    identifying, by the processing circuitry of the controller, one or more functions of the at least one mobile electronic device based on the factors vector; and controlling the identified one or more functions of the at least one mobile electronic device including
  disabling the one or more functions to provide a disabled function,
  detect an attempt to activate the disabled function;
  update an attempt counter in response to detecting an attempt to activate the disabled function; and
  send an alert to an external device when the attempt counter reaches a predetermined threshold.

15. The method of claim 14, further comprising:
determining a location of the at least one mobile electronic device within the vehicle;
identifying a predefined detection zone associated with the location from a plurality of predefined detection zones; and
updating one or more values of the factors vector based on the identified predefined detection zone.

16. The method of claim 15, wherein each predefined detection zone is a circle having a radius that is a predetermined distance from the center of a driver seat of the vehicle.

17. The method of claim 15, wherein the plurality of predefined detection zones includes a driver zone, a front seat passenger zone, and a back seat passenger zone of the vehicle.

18. A non-transitory computer readable medium storing computer-readable instructions therein which when executed by a computer cause the computer to perform a method for controlling an electronic device, the method comprising:
identifying at least one electronic device located within a vehicle, the processing circuitry including a first register configured to store at least a factors vector characterizing the vehicle and a user of the at least one electronic device,
determining an operating status of the vehicle;
updating one or more values of the factors vector based on the operating status of the vehicle;
identifying one or more functions of the at least one electronic device based on the factors vector; and
controlling the identified one or more functions of the at least one electronic device including
  disabling the one or more functions to provide a disabled function,
  detect an attempt to activate the disabled function;
  update an attempt counter in response to detecting an attempt to activate the disabled function; and
  send an alert to an external device when the attempt counter reaches a predetermined threshold.

* * * * *